United States Patent [19]

Moran

[11] Patent Number: 4,819,321
[45] Date of Patent: Apr. 11, 1989

[54] METHOD FOR MAKING THE SEARCH COIL ASSEMBLY FOR METAL DETECTORS

[75] Inventor: James M. Moran, Leominster, Mass.

[73] Assignee: Barkley & Dexter Laboratories, Inc., Fitchburg, Mass.

[21] Appl. No.: 86,650

[22] Filed: Aug. 18, 1987

[51] Int. Cl.$^4$ .............................................. H01F 7/06
[52] U.S. Cl. .................................... 29/602.1; 29/605; 264/272.19; 264/46.5
[58] Field of Search ............... 29/602.1, 605; 336/84 C, 84 R, 96; 264/272.19, 46.5, 46.9; 427/104; 324/228, 238, 239, 240, 241, 242, 243

[56] References Cited

U.S. PATENT DOCUMENTS

| | | | |
|---|---|---|---|
| 2,237,254 | 4/1941 | Broekhuysen | 208/81 |
| 3,361,962 | 1/1968 | Albrecht | 324/41 |
| 3,368,175 | 2/1968 | Giegerich et al. | 336/84 C |

FOREIGN PATENT DOCUMENTS 96568 12/1983 European Pat. Off. .
2146128A 4/1985 United Kingdom .

Primary Examiner—P. W. Echols

[57] ABSTRACT

A coil assembly for a metal detector and a method for making coil assemblies for metal detectors of the type used for detecting metal fragments in foodstuffs and pharmaceuticals, the method comprising providing a frame of non-metallic material, the frame have an aperture therethrough for the passage of material undergoing inspection, applying a coating of carbon material to the exterior of the frame, applying a layer of plastic material over the carbon material, winding electrically conductive strands over the plastic material, fixing the frame to a rigid metal housing providing an enclosed void around the exterior of the coated frame and strands, and applying foam plastic in liquid form to the frame and strands until the void is filled with the foam plastic.

9 Claims, 1 Drawing Sheet

METHOD FOR MAKING THE SEARCH COIL ASSEMBLY FOR METAL DETECTORS

BACKGROUND OF THE INVENTION

1. The Field of the Invention

This invention relates to metal detectors of the type used to detect metal fragments in foodstuffs and pharmaceuticals, and is directed more particularly to an improved search coil assembly for metal detectors and a method for making search coil assemblies for such detectors.

2. Description of the Prior Art

In many industries, such as food processing, non-metallic materials, such as foodstuffs, are conveyed automatically to various processing machines and stations. A problem arises when tramp metal is introduced into the material stream. Such tramp metal can constitute a hazard if sold to the public in foodstuffs and even in the processing area can constitute a hazard for some types of processing machinery.

It is known in the art that the non-metallic material can be passed through the electromagnetic field of a search coil, and that if tramp metal is present in the material stream such metal will disturb the electromagnetic field of the search coil and induce a detectable error signal in the search coil. Responsive to the error signal, the material stream can be stopped, or diverted to a waste container, accompanied, if desired, by visual and audible alarm means.

The sensitivity of such search coil metal detector systems is related to the size of an aperture through which the non-metallic stream is directed and around which is disposed the search coil. The smaller the aperture, or passage hole, for the product under test, the smaller is the size of metallic particles that can be detected. It has, therefore, been common practice to select an aperture size which allows the product, and its conveying belt, to pass through the aperture with minimum clearance.

For example, if it were required to inspect a packaged food product whose outside dimensions were $4'' \times 5'' \times 10''$, with the 10'' dimension occurring in the direction of travel, the aperture size chosen probably would be on the order of $5'' \times 7''$. Since package or product size is a result of particular marketing and manufacturing requirements peculiar to each product at a given time, the resultant effect has been to require a very large number of different sizes and shapes of metal detectors to be maintained in inventory, or to require the extensive time delay in the making of a custom metal detection machine for a new sized product.

The size and shape requirements have resulted in a difficult manufacturer - end user relationship. The manufacturer must maintain a large number of different sizes, many of which may be inventoried for an uneconomical period of time. The alternative, as mentioned above, is to build to order. Because of the laborious manner in which the search coil assemblies are made, producing a particular size and/or shape to order is quite expensive and time-consuming.

Because of the expense involved, it is customary that such detectors are used only at processing plants or distribution points. At times, metal is introduced into the product after the product leaves the processing plant and before sale to a consumer. Such is likely to be the case in occasions of "tampering".

The present state of the art in the manufacture of metal detector coil assemblies requires the production of a metal housing to serve as a metallic shield around the electrical coils. When the correct size frame is made, the internal walls thereof are coated with graphite and over the graphite, a coating of plastic. On the external walls, the conductive strands are wound on the non-metallic frame which is then attached to a rigid metal housing which provides an enclosed void around the exterior of the frame and strands. The space between the strands and the housing is then filled with non-metallic filler, such as an epoxy. The filler acts as a moisture sealant, as well as a retainer for reducing the relative motion between the metal housing and the strands. Any relative motion between the strands and the surrounding metal housing results in a spurious signal.

The above-described method requires, in ordinary practice, about ten to thirty weeks to produce a detector apparatus ready for commercial use, an obviously lengthy and very expensive method of production.

Accordingly, an object of the invention is to provide a method for making metal detection devices, and particularly the search coil assembly portion thereof, in a manner greatly reducing the time required to produce such components, so that metal detectors of various sizes may be produced quickly, without the need for maintaining large inventories.

A further object of the invention is to provide a method for making search coil assemblies for metal detection devices, the method providing such economic benefits as to render purchase and use of such devices at the retail level practicable from an economic standpoint.

A still further object of the invention is to provide an improved search coil assembly made in accordance with the above-described method.

SUMMARY OF THE INVENTION

With the above and other objects in view, as will hereinafter appear, a feature of the present invention is the provision of a method for making search coil assemblies for metal detectors, the method including the steps of providing a frame of non-metallic material, the frame having an aperture therethrough to facilitate passage therethrough of material undergoing inspection, applying a coating of carbon material to the exterior of the frame, applying a layer of plastic material over the carbon material, winding electrically conductive strands about the frame, fixing the frame to a rigid metal housing providing an enclosed void around the exterior of the coated frame and strands, and applying a foam plastic in liquid form to the frame and strands, until the void is filled with the foam plastic.

A further feature of the present invention is the provision of a metal detector search coil assembly comprising a frame of non-metallic material, the frame having an aperture therethrough, a layer of carbon material disposed on external surfaces of the frame, a layer of plastic material disposed over the carbon material, coils of electrically conductive strands wound upon the exterior plastic coated surfaces of the top, bottom and side walls of the frame, the frame being attached to a rigid metal coated frame, and foam plastic material disposed in the chamber to embed the strands therein and fill the chamber.

The above and other features of the invention, including various novel details of construction and combinations of parts, will now be more particularly described with reference to the accompanying drawings and pointed out in the claims. It will be understood that the particular method and device embodying the invention are shown by way of illustration only and not as limitations of the invention. The principles and features of this invention may be employed in various an numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

In the drawings.

DESCRIPTION OF THE PREFERRED EMBODIMENTS

Figure 1:
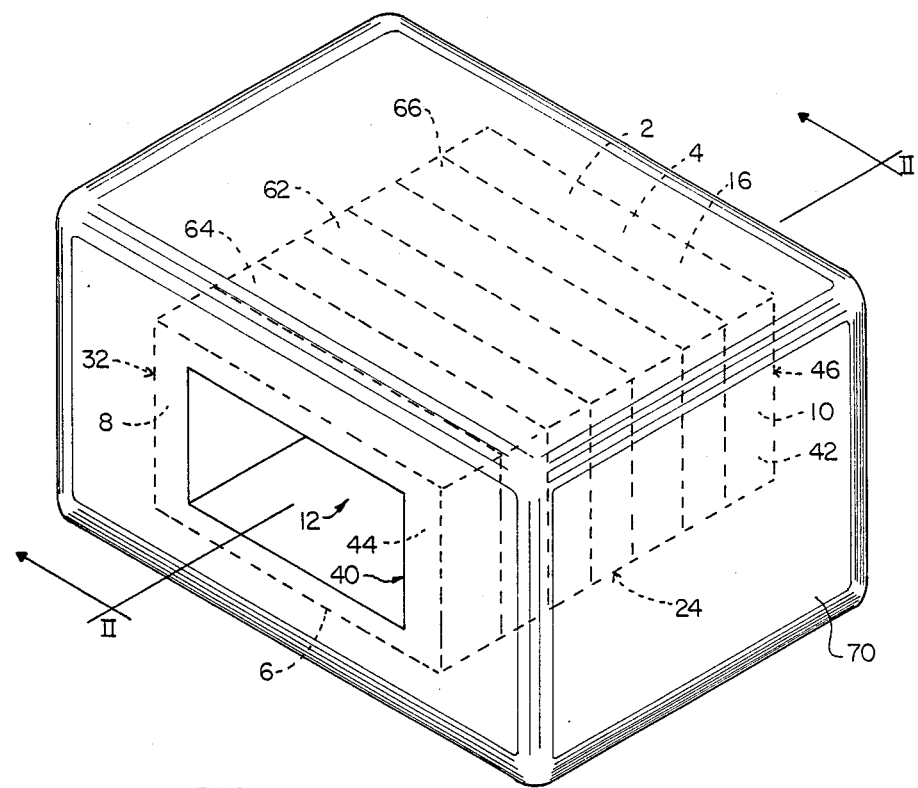
FIG. 1 is a perspective view of one form of apparatus provided in accordance with the invention.

Referring to the drawings, it will be seen that there is provided a frame 2 having a top member 4, a bottom member 6, and side members 8, 10, defining an aperture 12 therethrough. The frame is constructed of non-metallic material, such as plastic or wood. If a wood frame is used, the members 4, 6, 8, 10 are preferably glued together, or held together by brass screws (not shown). If a plastic frame is used, the frame may be an integrally molded member. The top frame member 4 has an internal surface 14, an external major surface 16, and end surfaces 18, 19. The bottom frame member 6 is similarly provided with an internal surface 22, an external major surface 24, and end surfaces 26, 28. The first frame side member 8 is provided with an internal surface 30, an external major surface 32, and end surfaces 34, 36. In like manner, the second frame side member 10 is provided with an internal surface 40, an external major surface 42, and end surfaces 44, 46.

In the embodiment shown in FIG. 1, each of the external major surfaces 16, 24, 32 and 42, is provided with a coating 50 of a carbon material, such as graphite. The coating 50 of carbon material may be sprayed onto the frame external surfaces. To the coating 50 there is applied an additional coating 52 of insulative plastic.

After completion of the frame 2 and the coatings 50 and 52, electrically conductive strands comprising conductive tapes 60, are wound upon the plastic coating 52. The conductive strands 60 may be placed upon vinyl tape strands 54. Typically, the tapes 60 are arranged as shown in the drawings, defining three coils, each coil made up of one tape. A "transmit" coil 62 is disposed centrally of the frame, and on either side thereof is disposed a "receive" coil 64, 66. Each of the coils 62, 64, 66 has two free ends (not shown) which lead away from the assembly.

In operation of the search coil assembly, it is imperative that there be no relative movement between the conductive tapes 60 and the frame 2. To insure that such movement does not occur, the tapes 60 (less the free ends) are embedded in molten plastic. It is also important that no moisture reach the tapes. The embedding of the tapes 60 in plastic further serves to keep the tapes free from moisture. To facilitate the embedding phase, the coated frame, with coils wound thereon, is attached to a rigid metal housing 70 which provides an enclosed void 72 around the exterior of the coated frame 2 and tapes 60. The metal housing 70 is preferably of zinc, aluminum or stainless steel.

With the frame 2 and housing 70 forming a hollow annulus, or void 72, the void is then filled with molten foam plastic 80. The plastic 80 is preferably a foam-in-place plastic, or any such plastic, or plastic-like matter as will readily adhere to the coated frame 2 and strands 60. The plastic 80 may be injected into the void 72. A polyurethane foam type plastic has been found to be advantageous. This material may be applied as a liquid which, upon setting, goes through an expansion process which fills all voids around the coils and within the metal housing 70.

Figure 2:
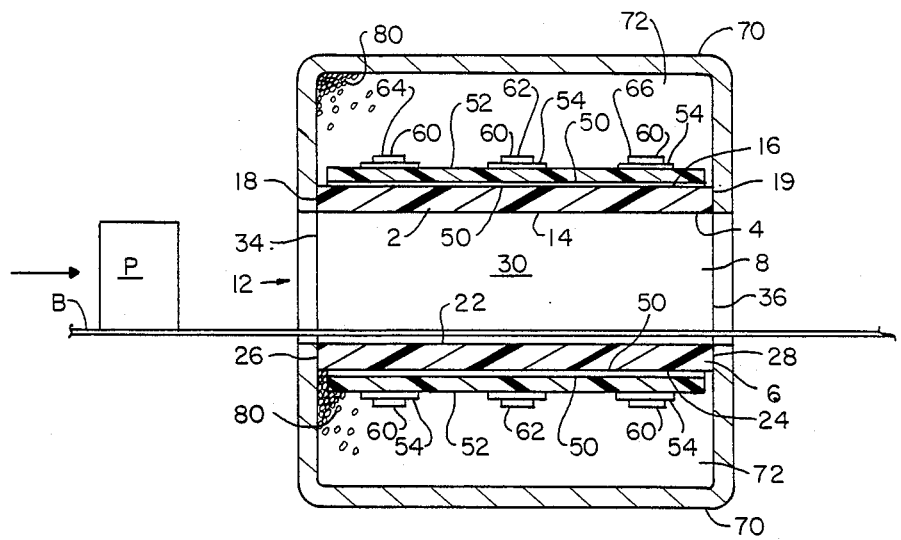
FIG. 2 is a sectional view, taken along line II—II of FIG. 1, and showing a conveyor belt and product thereon to be passed through the detector.

Upon completion of the above series of steps, there is provided a metal detector search coil unit, as shown in FIG. 2, including the frame 2, carbon and plastic coatings 50, 52 disposed over the external walls of the frame, coils of electrically conductive strands 60 wound on the external walls of the frame over the plastic coating, a body 80 of plastic adhering to and enveloping the frame and strands, and a metal housing 70 containing the plastic material 80.

The search coil assembly is then connected to the remainder of a metal detector apparatus, including a conveyor belt B (FIG. 2) extending through the aperture 12 to convey package P through the aperture for inspection for metal particles, in accordance with known procedures, and the coil free ends connected to electronic circuitry disposed in the coil assembly (not shown) or external to the search coil assembly.

It is to be understood that the present invention is by no means limited to the particular construction herein disclosed and/or shown in the drawings, but also comprises any modifications or equivalents within the scope of the disclosure.

Having thus described my invention, what I claim as new and desire to secure by Letters Patent of the United States is:

1. A method for making search coil assemblies for metal detectors, comprising providing a frame of non-metallic material, said frame defining an aperture therethrough of a selected size for inspection of a selected product of a given size, applying a coating of carbon material to the exterior of said frame, applying a layer of plastic material over said carbon material, winding electrically conductive strands about said frame, fixing said frame to a rigid metal housing providing an enclosed void around the exterior of the coated frame and said strands, and applying foam plastic in liquid form to said frame and said strands, until said void is filled by said plastic.

2. The method in accordance with claim 1 in which said frame comprises a top portion, a bottom portion, and side portions.

3. The method in accordance with claim 2 in which said conductive strands comprise tape applied to said plastic coating of said top, bottom and side portions.

4. The method in accordance with claim 2 in which said conductive strands are wound upon vinyl tape applied to said plastic coating of said top, bottom and side portions.

5. The method in accordance with claim 1 in which said carbon material is sprayed onto said frame.

6. The method in accordance with claim 1 in which said foam plastic is injected into said void to cover said frame and strands.

7. The method in accordance with claim 1 in which said metal housing is aluminum.

8. The method in accordance with claim 1 in which said metal housing is stainless steel.

9. The method in accordance with claim 1 in which said metal housing is zinc.

* * * * *